Patented Jan. 27, 1953

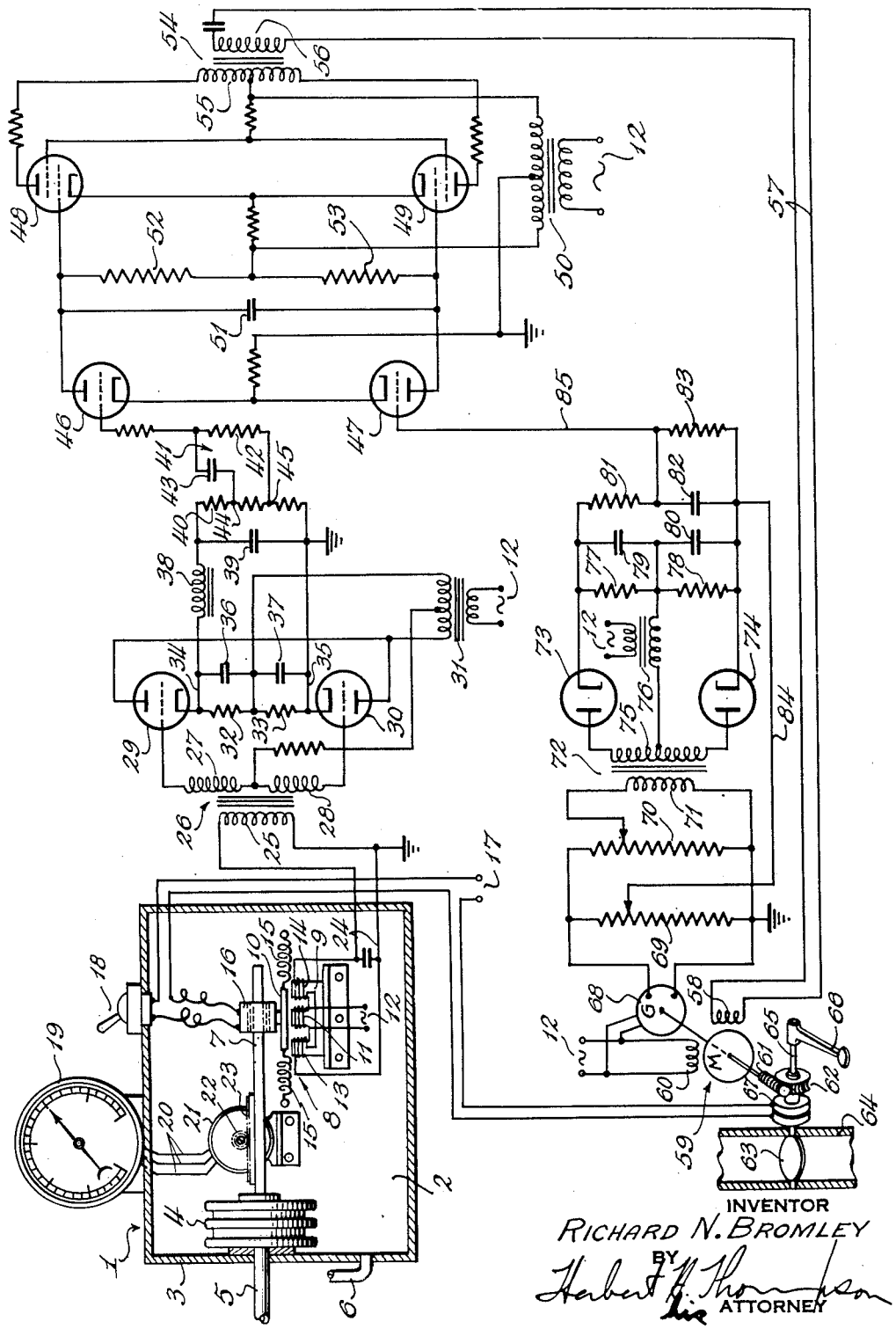

2,626,767

UNITED STATES PATENT OFFICE 2,626,767

AUTOMATIC SPEED CONTROL SYSTEM

Richard N. Bromley, Philadelphia, Pa., assignor to The Sperry Corporation, a corporation of Delaware Application January 24, 1947, Serial No. 724,020

18 Claims. (Cl. 244—77)

My invention broadly relates to and the principal object thereof resides in providing, a system for automatically maintaining a variable quantity at a selected value under those conditions where the value of the quantity may vary for a given position or displacement of the control means or member employed in controlling the value of said quantity.

Ordinarily, where a quantity, the value of which is dependent solely upon the setting of the control thereover and is not a variable for such a setting, it is customary for stable control purposes to provide a repeatback from the control so that the condition or position thereof is dependent upon the control signal. For example, in those cases where a servo system is operated in accordance with an input signal to provide a displacement in the output of the system proportional to the magnitude of the control signal, a displacement feedback is provided which provides a signal proportional to the displacement of the servo output, and, when the repeatback signal matches the input control signal, the displacement of the servo output is proportional to the input signal. This type of system is satisfactory in those cases where the quantity being controlled has a known or fixed value for given displacement outputs of the servo mechanism. The present invention is designed to provide a similar type of stable control system for performing an accurate and automatic control over the value of a variable quantity where the value of the quantity may vary for any given position of the control therefor, or, in other words, where the output of the automatic control system or the displacement value of the control operated thereby is a variable for any given or desired value of the quantity being controlled.

As above indicated, it is the principal object of the present invention to provide a system for automatically maintaining a variable quantity at a certain value wherein a reference is set at the desired value, a signal is derived when there is disagreement between the reference value and the value of the variable quantity, and the signal is employed to control a servo system including a servomotor which operates the control which in turn regulates said quantity, said system being of such character as to maintain the value of said quantity at the value established by the reference even though the displacement of the control over the quantity or the output of the servo system is a variable for any given or desired value of quantity.

The broad concepts of the present invention will be more clearly understood and the underlying problems fully appreciated from the following wherein I have set forth a specific application of the present invention in connection with a preferred form of the present invention designed for automatically controlling the air speed of an aircraft.

It is desirable especially in connection with automatic approach systems or blind landing systems to be able automatically to maintain the aircraft at a selected air speed. The air speed is ordinarily controlled by throttle valves controlling the speed of the aircraft motors. However, there are many external factors separate from the speed control system of the airplane motors which affect the air speed of the craft. For example, for a given setting of the throttle valves, the air speed does not bear a fixed value relative thereto. The air speed is affected not only by throttle setting but also by such factors as the position of the landing gear, the position of the flaps, the loading of the aircraft, pitch angle of the craft, the pitch of the propeller blades and other variables which affect lift or drag in flight. All variables of this character therefore enter into the determination of the correct throttle setting for a given air speed so that the requisite amount of power or speed may be developed by the motors. Under such conditions as above pointed out, it is readily seen that it is impossible to predict any definite position for the throttles to provide a given air speed and, therefore, it is impossible to employ a conventional type of position feedback system without encountering steady state errors caused by these variable factors. In other words, it would be impossible to establish a desired air speed and automatically control the craft to maintain said air speed through adjustment of the throttle setting by employing a system in which a signal proportional to the displacement of the throttles is fed back to match a control signal, in the conventional manner.

In the present invention, I propose to provide a system for automatically controlling the throttle setting of airplane motors which is so arranged as to provide a repeatback signal proportional to the displacement of the throttle controls and which will maintain the air speed of the craft at some desired value without any steady state errors which otherwise would be produced by the variable factors above set forth.

More specifically, it is an object of the present invention to provide an automatic control circuit for aircraft speed control purposes and the like having a positional repeatback of such character as to compensate for the variables affecting the value of the air speed or the quantity being controlled and thereby provide a positional repeatback control under such conditions.

More specifically, it is an object of the present invention to provide an automatic control system which includes a source of error signal for measuring disagreement between the selected value and the actual value of a variable quantity, a servomotor for controlling the value of said quantity, a means for supplying a repeatback signal proportional to displacement of the servomotor output and a means for gradually reducing said repeatback signal to zero, the motor being controlled in accordance with both of the signals.

Another object of this invention resides in providing a control system of the foregoing character in which the feedback signal proportional to the displacement of the servomotor output is a voltage which is gradually reduced to zero whereby the displacement output of the servomotor may vary for a given value of the quantity being controlled.

A still further object resides in providing a system wherein a signal or voltage proportional to the speed of the servomotor system is integrated to provide a displacement signal for feedback purposes and in which means are provided for gradually reducing the integration signal or voltage to zero, said means being preferably so arranged that the rate of reduction of the integration signal or voltage corresponds to the normal rate of correction of the error, that is, the rate of reduction of the error input signal.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Still another object resides in providing control systems of the foregoing characters which are controlled from a speed measuring device to operate the throttle valves for the motors of a craft to maintain the speed of the craft at some preselected value without any steady state errors due to external factors of the characters above pointed out.

My invention has special utility for use in automatic approach systems for aircraft where the craft is approaching a landing field on a radio glide path beam. When the craft is flying down the beam, its elevators are, of course, set to cause slow descent, but it is very important at that time that a minimum air speed be maintained to prevent stalling and at the same time not to materially exceed the desired landing speed. With my improved throttle control the proper air speed may be automatically maintained during descent within close limits and without hunting.

With the foregoing and still other objects in view, my invention includes the novel elements and the combinations and arrangements thereof described below and illustrated in the accompanying drawing which diagrammatically shows a preferred form and specific embodiment thereof.

In the drawings, I have shown a system for automatically regulating the throttle valves of the engines of an aircraft to maintain a preselected air speed and, for exemplary purposes, I have shown embodied therein an air speed meter together with an associated signal pickoff and a disconnect switch which is operable by the pilot to throw in or render the automatic air speed control system operable when the craft is brought to some desired air speed.

Referring now to the drawing, 1 indicates generally an air speed meter somewhat schematically illustrated as comprising a closed chamber 2 defined by the side walls 3. Within the chamber and suitably secured to one wall thereof, is a Sylphon-bellows 4. Total air pressure is supplied to the interior of the bellows by means of the tube 5. A second tube 6 supplies static pressure to the interior of chamber 2. Expansion and contraction of the bellows 4 is, therefore, dependent upon the difference between the total pressure and the static air pressure, and provides a measure of air speed. Shaft 7 is secured to the bellows 4 and may be supported by means not shown to move in translation, the position thereof being a measure of the air speed of the craft on which the meter is located.

Also positioned within the chamber 2 is a signal pick-off 8 herein illustrated as electrical in character and comprising an E-shaped core 9 and an armature 10, both of which are formed of magnetic material. The signal pick-off is energized by means of winding 11, which is mounted on the central leg of the core and connected with a suitable source of alternating current 12. The pickup windings 13 and 14 surround the outer legs and are connected together in series opposition to supply a signal voltage output of one phase sense or the other, depending upon the relative magnitude of the voltages generated in the two coils. Variations in these voltages are occasioned by movement of the armature 10 from a central position, wherein equal amounts of flux flow through the coil legs, and toward one or the other of the outer core legs, thereby differentially varying the amount of flux flowing in the outer legs.

The armature 10 is normally constrained to a central position, wherein zero voltage output is derived from the signal pick-off, by means of springs 15. A magnetic clutch 16 is connected to the armature 10 and operatively positioned with respect to shaft 7 so that, when energized, movement of shaft 7 will produce a similar movement of the armature 10. The clutch 16 is illustrated as connected with a suitable source of current 17, which may be the same as source 12, and its energization may be controlled by switch 18. It will be understood that the showing of the Sylphon bellows 4 and its pick-off mechanism in the figures is quite diagrammatic, no attempt having been made to show all parts such as clutch 16 or the pick-off 12, in detail or to scale, such parts being known in the art. The clutch 16 may be any suitable form of electromagnetic coupling and decoupling arrangement for coupling armature 10 of the inductive pick-off so as to be displaced with the longitudinal displacements of the shaft 7 and uncoupling the same therefrom. A preferred construction for Sylphon bellows, its clutching and declutching and pick-off arrangements is shown in the prior patent to A. W. Meston, No. 2,446,546, dated August 10, 1948, and assigned to the assignee of the present application. See clutch jaws 52 and 58 operated indirectly from the solenoid 75 whereby the armature 61 is caused to move with or to be freed from the shaft or pin 9 extending from the bellows 10.

With the foregoing arrangement of air speed meter and signal pick-off, the pilot may bring the craft to the desired air speed with the magnetic clutch de-energized, thereby permitting the Sylphon-bellows to actuate shaft 7 as a measure of air speed while the armature of the signal pick-off 8 remains in a central position providing zero signal output. When, however, the desired air speed is attained, switch 18 may be thrown to energize magnetic clutch 16 and thereby correlate or fix the zero voltage output position of the signal pick-off with the air speed meter at the selected value of air speed. In other words, at the selected air speed, zero signal voltage will be derived from the signal pick-off as long as the craft's actual air speed corresponds to the selected value. However, variations of the actual air speed above or below the selected value will produce a signal voltage output from the E-transformer or pick-off which has a phase sense dependent upon whether the actual air speed exceeds or is less than the selected air speed, and which will be of a magnitude dependent upon the amount of disagreement between the actual and selected values.

Solely for illustration purposes, I have shown an air speed dial 19 which will provide a visual indication of the actual air speed. The pointer on the dial may be actuated by a selsyn or similar type repeater motor which is connected through leads 20 to a selsyn or similar type transmitter 21, the rotor of which is driven by means of a pinion 22 meshing with rack 23 secured to the shaft 7.

The pickup coils of the signal pick-off are connected by leads 24 to the primary 25 of an input transformer 26. One of the leads 24 may be grounded as shown, to provide a measure of signal from and above ground as a fixed datum value. The two secondary windings 27 and 28 of input transformer 26 are connected together at one end of each and the other ends are respectively connected to the control grids of tubes 29 and 30 which are comprised in a demodulator or rectifier stage functioning as a cathode follower to provide a unidirectional signal voltage to the balanced amplifier. The respective voltages induced in the secondary windings 27 and 28 of input transformer 26 are supplied to the grids of tubes 29 and 30 in opposite phase relationship, while the plates of these tubes are energized in in-phase relation from the secondary of transformer 31. The primary of transformer 31 is connected to a suitable source of alternating current and preferably to the source 12 in order that a phase-sensitive operation of the demodulator stage may be effected. The output of this stage is derived in a differential manner from across the cathode resistors 32 and 33, or, in other words, pulsating unidirectional currents will appear in opposite polarity sense across resistors 32 and 33, and a voltage proportional to the voltage difference between the voltages across each cathode resistor will appear across the leads 34 and 35. In the absence of a signal voltage input to the grids of the tubes, the voltages across each cathode resistor will be equal and, being of opposite polarity sense, will provide zero differential voltage output. However, when a signal voltage is impressed on the grids of tubes 29 and 30, one or the other of the voltages across the cathode resistors will predominate, depending upon the phase-sense of the input signal or its relation to the phase of the plate potentials, and hence the output from this demodulator stage will be a unidirectional voltage having a polarity sense depending upon the phase-sense of the input signal and having a magnitude proportional to the amplitude of the input signal. Condensers 36 and 37 may be connected across resistors 32 and 33 as part of a filtering network. The balance of this circuit may comprise the choke 38 in series with one lead 34 and a condenser 39 connected across the leads 34 and 35. The filtered and smoothed unidirectional voltage is then applied across the resistance 40. Preferably, one lead, such as lead 35, is connected to ground as shown in order that the unidirectional signal voltage may be measured above ground.

In accordance with the preferred embodiment of my invention, the unidirectional signal voltage appearing across resistance 40, or some desired fraction thereof, is passed through a differentiating network to obtain a unidirectional voltage proportional to a first time derivative thereof or to the rate of change of signal voltage appearing across resistance 40 or rate of change of error, and components of both the displacement or error signal and of the rate of displacement or the first time derivative of the error signal is supplied preferably to one channel of a balanced amplifier, the other channel of the amplifier being arranged to receive damping and other feedback voltages such as, in accordance with the present invention, a voltage proportional to a time integration of the speed of the servomotor. The term "error" means the difference between the selected and actual air speeds and is measured as a displacement.

Therefore, a differentiating circuit, indicated generally at 41 and comprising a resistor 42 and condenser 43, is connected to receive a component of the voltage appearing across resistance 40. The reactance and resistance values of the condenser and resistor are such that the magnitude of the voltage appearing across the resistor is proportional to the rate of change of the voltage supplied thereto. In the present embodiment, the differentiating network is connected across points 44 and 45 on resistance 40 so that a fractional part of the voltage output from the demodulator stage is applied to the differentiating network, while the total signal input to one side or channel of the balanced amplifier, which is a summation of the voltages proportional to error or displacement and the first time derivative thereof, is derived from across resistor 42 and that portion of resistance 40 between the point 45 and ground. The summation voltage is applied to the grid of tube 46, which is comprised in one channel and in the first stage of a balanced two-stage amplifier. The differentiating or rate-taking circuit is employed to obtain a phase advance of the error input signal to compensate for lag in the servo.

The first stage of the balanced amplifier comprises the tubes 46 and 47. In the embodiment illustrated, the repeat-back voltages, that is, the voltages proportional to the speed of the servomotor and to a time integration thereof are applied to the grid of the tube 47, whereas the error signal and the first time derivative thereof is applied to the grid of tube 46. The plates of tubes 46 and 47 are respectively connected directly with the control grids of tubes 48 and 49 which are comprised in the second and output stage of the balanced amplifier. Plate potentials are derived from the secondary of transformer 50, the primary of which is connected to a suitable source of reference voltage, preferably the source 12. It will be noted that the plates of tubes 48 and 49 are energized in in-phase relation but in out-of-phase relation to the plates of tubes 46 and 47. In order to hold over the signal output of tubes 46 and 47 from one half cycle to the next, condenser 51 is connected between the plates of tubes 46 and 47 or across the coupling resistors 52 and 53. The cathodes of tubes 46 and 47 are connected to the mid tap of the secondary of transformer 50 and to ground, as shown, in order that the amplifier may work from ground as a datum value. The plates of tubes 48 and 49 are connected to opposite ends of the primary 55 of output transformer 54 and the center tap of this primary is connected with the secondary of transformer 50. The voltage induced in the secondary 56 of transformer 54 will depend upon the outputs of tubes 48 and 49. Normally, the current in the two halves of the primary 55 will oppose and balance each other when zero signal voltage is applied either to the grid of tube 46 or 47. When, however, the current in one half of primary 55 predominates over that of the other half, a pulse having a phase sense dependent upon the phase of the predominating current in the primary and of a magnitude proportional to the difference value of the currents in the primary will be induced in transformer secondary 56.

The voltage induced in the secondary 56 of output transformer 54 is supplied through leads 57 to one phase 58 of a two-phase servomotor indicated generally at 59. The servomotor may be of any desired nature and either A. C. or D. C., depending upon the nature of the amplifier output, and, for illustrative purposes, I have shown a two-phase induction type motor, the second phase 60 of which is connected to a suitable source of alternating current such as source 12. The output of motor 59 is connected in any suitable manner such as by a worm 61 and worm wheel 62 to operate the motor throttle or butterfly valve 63 which is mounted in duct 64 and functions to control the speed of the motors of the aircraft. In the drawing I have schematically represented the butterfly valve 63 as mounted on shaft 65 for manual operation by the lever 66. The worm wheel may be secured to a sleeve rotatably mounted upon the shaft 65 but capable of being coupled thereto by means of a magnetic clutch 67. The energization of clutch 67 is preferably controlled by the switch 18 hereinbefore described as connected in circuit with the magnetic clutch 16 for operatively connecting the armature 10 of the pick-off with the shaft 7 of the air speed meter.

For stabilizing purposes, that is, for damping and also for the purpose of providing a displacement type of feed-back, I provide a generator 68 which is coupled to and driven by the servomotor 59 and functions to provide a voltage output which in amplitude is proportional to the speed of the servomotor and has a phase sense dependent upon the direction of rotation thereof. In the present case I have illustrated generator 68 as an A. C. type generator although of course a reversible polarity, permanent magnet or D. C. generator could be employed. The output of generator 68 is connected across two potentiometers 69 and 70 which provide means for regulating the order of magnitude of the signal voltages utilized and also the relative magnitudes thereof.

In order to obtain a voltage proportional to a time integration of the alternating voltage developed by generator 68, one end of potentiometer 70 is connected to one side of the primary winding 71 of a coupling transformer 72 and the other end of said primary is connected to the wiper engaging the resistance element of the potentiometer. Hence, a desired fraction of the voltage across the potentiometer 70 is supplied through the coupling transformer 72 to a rectifier comprising the two diodes 73 and 74. The two ends of the secondary 75 of the transformer 72 are respectively connected to the plates of the diodes while the center tap thereof is connected to one end of the secondary of an input transformer 76. The cathodes of the diode are connected respectively through resistors 77 and 78 to the other end of the secondary of transformer 76, the primary of which is preferably energized from alternating current source 12 so that a phase sensitive rectification of the voltage supplied by transformer 72 may be effected. Smoothing condensers 79 and 80 may be connected across resistors 77 and 78 and the resultant smoothed unidirectional voltage is applied across a series-connected resistor 81 and condenser 82. It will be observed that the rectifier functions as a phase-sensitive, differential rectifier to provide a unidirectional voltage output which in amplitude is proportional to the amplitude of the voltage supplied by the generator 68 and which in polarity sense is dependent upon the phase sense of the generator voltage. Since the phase sense of the voltage output of the generator 68 is dependent upon the direction of rotation thereof, and since the amplitude of the generated voltage is proportional to the speed of rotation, the unidirectional voltage impressed across the series-connected resistor 81 and capacitance 82 will be an indication of the direction and a measure of the speed of operation of the servomotor.

The network comprising condenser 82 and resistor 81 functions as a time integrating network to integrate the speed voltage with respect to time so that the voltage across condenser 82 will be proportional to the displacement of the servomotor output. In accordance with my invention, however, this integration voltage is gradually reduced to zero in order to compensate for the external variable factors affecting the proper setting of the throttle control valve for any selected air speed of the craft. In the present embodiment, I have shown a resistor 83 connected across the condenser 82 which functions to discharge the condenser and reduce the integration voltage to zero. The provision of resistor 83 is not essential however because the resistors, such as 81, 77 and 78, may serve this purpose. Preferably the value of resistance employed in discharging condenser 82 is so chosen that the integration voltage will gradually reduce to zero at a rate which corresponds to the normal rate at which the error signal is reduced to zero through the operation of the servo system.

In addition to providing a feedback voltage proportional to a time integration of the speed of the servomotor with wipeout thereof or gradual reduction to zero, I also feed back a voltage proportional to the speed of the servomotor for damping purposes. To this end, the wiper on potentiometer 69 is connected through lead 84 to one end of condenser 82 as shown, the other end of said condenser being connected through lead 85 to the grid of tube 47. In order to maintain these feedback voltages at values measured with respect to ground, one end of both potentiometers 69 and 70 is preferably grounded.

It is to be observed that with the circuit arranged as shown, the size order or voltage range of the speed voltage and the integration voltage may be separately adjusted through operation of the potentiometers 69 and 70. As a result, the size order of the speed voltage may be adjusted to provide satisfactory damping without in any way affecting the time constant of the integrating network. In other words, optimum damping may be obtained without affecting the time constant of the integrating network which may therefore provide a desired range of values of voltage proportional to a time integration of the servomotor speed with a reduction thereof to zero at the most desirable rate.

It will be understood that both the time integration voltage and the speed voltage are applied in a degenerative sense to the balanced amplifier. That is, in a sense opposing the signal voltages applied to the grid of tube 46. With this arrangement, the time integration voltage will provide a displacement feedback to match the error signal input while its decay to zero will permit the error signal to go to zero. Additionally, the speed voltage derived from potentiometer 69, being applied degeneratively to the amplifier in the same sense as the integration voltage, will function to provide damping or reduce oscillations in the servo loop.

The operation of the system, above described, is, briefly, as follows. Assuming that the aircraft is brought to some desired air speed as measured by the air speed meter, switch 18 is actuated to set the signal pick-off at zero for the selected air speed value. Any deviation of the aircraft from the selected air speed will result in a voltage output from the pick-off of a phase sense dependent upon whether the air speed of the craft exceeds or becomes less than the selected value and the amplitude will be proportional to the amount of error or disagreement between the selected and actual speed values. By phase-sensitive demodulation, a unidirectional signal voltage having components proportional to the error and to the time rate of change of error is applied to one side or channel of the balanced amplifier, thereby effecting an operation of the servomotor in a direction dependent upon the polarity sense of the unidirectional signal voltage inputs. The servomotor then operates to increase or decrease the throttle opening and in a direction tending to reduce the error signal to zero.

The time integration voltage which is fed back in a degenerative sense to the balanced amplifier will function to provide a displacement feedback which, because it gradually reduces to zero, affords a temporary matching or comparison of the displacement in the output of the servo with the error signal during changing or transient conditions, while allowing both signals to reduce to zero and to be of zero value when the actual air speed and the selected air speed coincide. If, when the time integration voltage reduces to zero, at which time the servomotor has no rate or is stationary, and there remains an error signal voltage input to the amplifier, there is obviously still some disagreement between the actual and selected air speeds because of the external variable factors of the nature hereinabove pointed out. This additional signal will therefore effect a further operation or creeping of the servomotor toward a zero error signal position, producing an additional displacement in its output of such magnitude as to overcome the effect of such variables. Hence, eventually, complete agreement in the actual and selected speed values will result. Obviously, under different conditions or different values of the external variable factors, the displacement of the servomotor will vary to zero the error for any chosen air speed, but in all cases due to the provision of a time integration signal and the gradual reduction thereof to zero, the actual air speed of the craft may be brought into agreement with the selected air speed without any continuing or steady state errors or discrepancy therebetween otherwise occasioned by such variables.

Although I have described and herein illustrated a preferred embodiment of my invention and a specific use thereof, it will be understood that my invention, in its broader aspects, may be used in all cases where a control value, for example, the position of a control member, controlling a variable, is or may be a variable for any desired value of the controlled variable. Hence, while I have described my invention in its preferred embodiment, it is to be understood that the words which I have used are words of description rather than of limitation and that changes within the purview of the appended claims may be made without departing from the true scope and spirit of my invention in its broader aspects.

What is claimed is:

1. A control system for aircraft speed control comprising an air speed measuring means, a pick-off associated therewith for supplying a signal dependent on deviation in air speed of the craft from a selected air speed value, a throttle valve for controlling the air speed of said aircraft, a servomotor connected to operate said throttle valve, means for supplying a signal proportional to servomotor speed, means for integrating said speed signal to provide an integration signal substantially proportional to a time integral of the speed signal but gradually decaying whereby it may go to zero when the motor speed goes to zero, and means for controlling said servomotor in accordance with the difference between said signals.

2. A control system for aircraft speed control comprising an air speed measuring means, an electrical pick-off associated therewith for supplying a signal voltage dependent on deviation in air speed of the craft from a selected air speed value, a throttle valve for controlling the air speed of said aircraft, a servomotor connected to operate said throttle valve, means for supplying a voltage proportional to servomotor speed, means for integrating said speed voltage to provide an integration voltage substantially proportional to a time integral of the speed voltage but gradually decaying whereby it may go to zero when the motor speed goes to zero, and means for controlling said servomotor in accordance with the difference between said voltages.

3. A control system for aircraft speed control comprising an air speed measuring means, an electrical pick-off associated therewith for supplying a signal voltage dependent on deviation in air speed of the craft from a selected air speed value, a throttle valve for controlling the air speed of said aircraft, a servomotor connected to operate said throttle valve, means for supplying a voltage proportional to motor speed, means for integrating said speed voltage to provide an integration voltage substantially proportional to a time integral of the speed voltage but gradually decaying whereby it may go to zero when the motor speed goes to zero, and means for controlling said servomotor in accordance with the difference between the first mentioned signal voltage and the sum of said speed voltage and integration voltage.

4. A servo system for controlling the speed of a craft comprising speed measuring means, an electrical pick-off associated therewith for supplying a signal voltage dependent upon deviation in speed of said craft from a selected value, means for controlling the speed of said craft, a servomotor connected to operate said control means, means for supplying a voltage proportional to the speed of said servomotor, an impedance-capacitance integrating network connected to receive said speed voltage and to provide in its output an integration voltage proportional to a time integral of said speed voltage, said network being operable to provide a gradually decaying integration voltage whereby it may go to zero when the motor speed goes to zero, and means for controlling said servomotor in accordance with the difference between said first mentioned signal voltage and said integration voltage.

5. A servo system for controlling the speed of a craft comprising speed measuring means, an electrical pick-off associated therewith for supplying a signal voltage dependent upon deviation in speed of said craft from a selected value, means for controlling the speed of said craft, a servomotor connected to operate said control means, means for supplying a voltage proportional to the speed of said servomotor, an impedance-capacitance integrating network connected to receive said speed voltage and to provide in its output an integration voltage proportional to a time integral of said speed voltage, said network being operable to provide a gradually decaying integration voltage whereby it may go to zero when the motor speed goes to zero, and means for controlling said servomotor in accordance with said first mentioned signal voltage, said speed voltage and said integration voltage.

6. A servo system of the character described comprising means for providing an error signal proportional to the difference between a desired value and a measured value of a quantity, displaceable control means for controlling the value of said quantity, the relationship of the position of said control means to the resulting value of said quantity being a variable, a motor for driving said displaceable control means, means for supplying a second signal proportional to the output displacement of said motor but gradually decaying whereby it may go to zero when the displacement becomes a constant, and means for controlling said motor in accordance with both of said signals.

7. A servo system of the character described comprising means for providing an error signal proportional to the difference between a desired value and a measured value of a quantity, displaceable control means for controlling the value of said quantity, the relationship of the position of said control means to the resulting value of said quantity being a variable a motor for driving said displaceable control means, means for supplying a second signal proportional to the output displacement of said motor but gradually decaying whereby it may go to zero when the displacement becomes a constant, and means for controlling said motor in accordance with the difference between said signals.

8. A servo system of the character described comprising means for providing an error signal proportional to the difference between a desired value and a measured value of a quantity, displaceable control means for controlling the value of said quantity, the relationship of the position of said control means to the resulting value of said quantity being a variable, a motor for driving said displaceable control means, means for supplying a second signal proportional to motor speed, means for integrating said second signal, said integrating means being operable to provide a gradually decaying signal whereby it may go to zero when the motor speed goes to zero, and means for controlling said motor in accordance with the difference between said signals.

9. A servo system of the character described comprising means for providing an error signal proportional to the difference between a desired value and a measured value of a quantity, displaceable control means for controlling the value of said quantity, the relationship of the position of said control means to the resulting value of said quantity being a variable, a motor for driving said displaceable control means, means for supplying a second signal proportional to motor speed, means for integrating said second signal, said integrating means being operable to provide a gradually decaying integration signal whereby it may go to zero when the motor speed goes to zero, and means for controlling said motor in accordance with the difference between said error signal and the sum of the speed signal and the integration signal.

10. A servo system of the character described comprising means for providing an error voltage proportional to the difference between the desired value and a measured value of a quantity, displaceable control means for controlling the value of said quantity, the relation of the position of said control means to the resultant value of said quantity being a variable, a motor for driving said displaceable control means, means for supplying a signal voltage proportional to the output displacement of said motor but gradually decaying whereby it may go to zero when the displacement becomes a constant, and means for controlling said motor in accordance with both of said voltages.

11. A servo system for controlling the speed of an aircraft comprising means for providing an error voltage proportional to the difference between the desired speed and measured speed, displaceable control means for controlling the power developed by the aircraft engine, the relation of the position of said control means to the resultant speed of the aircraft being a variable, a motor for driving said displaceable control means, means for supplying a signal voltage proportional to motor speed, electrical integrating means connected to receive said speed voltage and to supply a voltage proportional to a time integration thereof, said integrating means being operable to provide a gradually decaying integration voltage whereby it may go to zero when the motor speed goes to zero, and means for controlling said motor in accordance with said error voltage and said integration voltage.

12. A servo system of the character described comprising means for providing an error voltage proportional to the difference between the desired value and a measured value of a quantity, displaceable control means for controlling the value of said quantity, the relation of the position of said control means to the resultant value of said quantity being a variable, a motor for driving said displaceable control means, means for supplying a signal voltage proportional to motor speed, electrical integrating means connected to receive said speed voltage and to supply a voltage proportional to a time integration thereof, said integrating means being operable to provide a gradually decaying integration voltage whereby it may go to zero when the motor speed goes to zero, and means for controlling said motor in accordance with the difference between said error voltage and the sum of said speed voltage and said integration voltage.

13. A servo system of the character described comprising means for providing an error signal proportional to the difference between a desired value and a measured value of a quantity, displaceable control means for controlling the value of said quantity, the relationship of the position of said control means to the resulting value of said quantity being a variable, a motor for driving said displaceable control means, means for providing a rate signal proportional to the time rate of change of said error signal, means for supplying a signal proportional to the displacement output of said motor but gradually decaying whereby it may go to zero when the displacement becomes a constant, means for supplying a signal proportional to the motor speed, and means for controlling said motor in accordance with the difference between the sum of said error and rate signal and the sum of said displacement and speed signal.

14. A servo system for controlling the speed of an aircraft as claimed in claim 11 in which the electrical integrating means comprises an impedance-capacitance integrating network.

15. A servo system for controlling the speed of an aircraft as claimed in claim 11 in which the electrical integrating means for supplying a decaying voltage comprises an impedance-capacitance integrating network having an additional impedance in circuit with the capacitance thereof.

16. A servo system of the character described comprising means for providing an error signal proportional to the difference between a desired value and a measured value of a quantity, displaceable control means for controlling the value of said quantity, the relationship of the position of said control means to the resulting value of said quantity being a variable, a motor for driving said displaceable control means, means for providing a rate signal proportional to the time rate of change of said error signal, means for supplying a signal proportional to the speed of said motor, means for supplying a signal proportional to a time integration of said speed signal but gradually decaying whereby it may go to zero when the motor speed goes to zero, and means for controlling said motor in accordance with the difference between the sum of said error and rate signals and the sum of said integration and speed signals.

17. A control system for aircraft speed control comprising an air speed meter, a pick-off for supplying a signal dependent on deviation in air speed of the craft from a selected air speed value, air speed control means, a servomotor operatively connected to drive said control means, means for supplying a second signal proportional to the output displacement of said motor but gradually decaying with time whereby it may go to zero when the displacement becomes a constant, and means for controlling said servomotor in accordance with the difference between said signals.

18. A control system for aircraft speed control comprising air speed measuring means, an electrical pick-off associated therewith for supplying a signal voltage dependent upon deviation in air speed of the craft from a selected air speed value, air speed control means, a servomotor operatively connected to drive said control means, means for supplying a signal voltage proportional to the output displacement of said servomotor but gradually decaying with time whereby it may go to zero when the displacement becomes a constant, and means for controlling said servomotor in accordance with the difference between said signal voltages.

RICHARD N. BROMLEY.

REFERENCES CITED

The following references are of record in the file of this patent:

UNITED STATES PATENTS

| Number | Name | Date |
|---|---|---|
| 2,068,490 | Hull | Jan. 19, 1937 |
| 2,113,436 | Williams | Apr. 5, 1938 |
| 2,160,194 | Bates | May 30, 1939 |
| 2,273,022 | Crane et al. | Feb. 17, 1942 |
| 2,311,642 | Crane et al. | Feb. 23, 1943 |
| 2,391,896 | Hanson | Jan. 1, 1946 |
| 2,401,421 | Hahn | June 4, 1946 |
| 2,414,102 | Hull et al. | Jan. 14, 1947 |
| 2,496,294 | Kellogg | Feb. 7, 1950 |